United States Patent [19]

Jones et al.

[11] 4,094,367

[45] June 13, 1978

[54] SYSTEM FOR SINGLE DRAFT WEIGHING OF CARS COUPLED IN MOTION

[75] Inventors: William F. Jones, Glenview; Gerald J. Hochberger, Chicago, both of Ill.

[73] Assignee: Railweight, Inc., Elk Grove Village, Ill.

[21] Appl. No.: 769,032

[22] Filed: Feb. 16, 1977

[51] Int. Cl.² ............................................ G01G 19/04
[52] U.S. Cl. ................................... 177/1; 177/25; 177/116; 177/163; 177/DIG. 8; 364/567
[58] Field of Search ............... 177/1, 25, 163, DIG. 8, 177/134, 116; 364/567

[56] References Cited

U.S. PATENT DOCUMENTS

| | | | |
|---|---|---|---|
| 3,374,844 | 3/1968 | Rogers | 177/134 |
| 3,825,734 | 7/1974 | Jacobs | 177/25 X |
| 3,842,922 | 10/1974 | Fagin | 177/1 |
| 4,036,315 | 7/1977 | Flinta | 177/1 |

*Primary Examiner*—Joseph W. Hartary
*Attorney, Agent, or Firm*—George H. Gerstman

[57] ABSTRACT

A system is provided for weighing railroad cars coupled in motion by providing a first scale and a second scale located forward of the first scale. The railroad cars are moved over the first and second scales, the rear trucks of the railroad cars are weighed on the first scale and the weight is stored. While the rear truck of a railroad car under consideration is on the first scale, the front truck of the railroad car under consideration plus the rear truck of the just preceding railroad car are weighed on the second scale. The weights on the first and second scales are totaled and the stored weight of the rear truck of the just preceding railroad car is subtracted to obtain the full draft weight of the railroad car under consideration.

The railroad car under consideration may be loaded while it is being weighed and in motion. A preload compensating amount is added to the totaled weights on the first and second scales to compensate for the weight of material that will continue through the chute after the chute is closed. A plurality of discrete weighings is performed during loading of the railroad car under consideration. After the loading is terminated, a final weight reading is performed to obtain the full draft weight of the loaded car under consideration. Loading of the railroad car is terminated when either the full draft weight reaches a predetermined amount or when the rear truck of the railroad car under consideration reaches a preselected location on the first scale.

27 Claims, 7 Drawing Figures

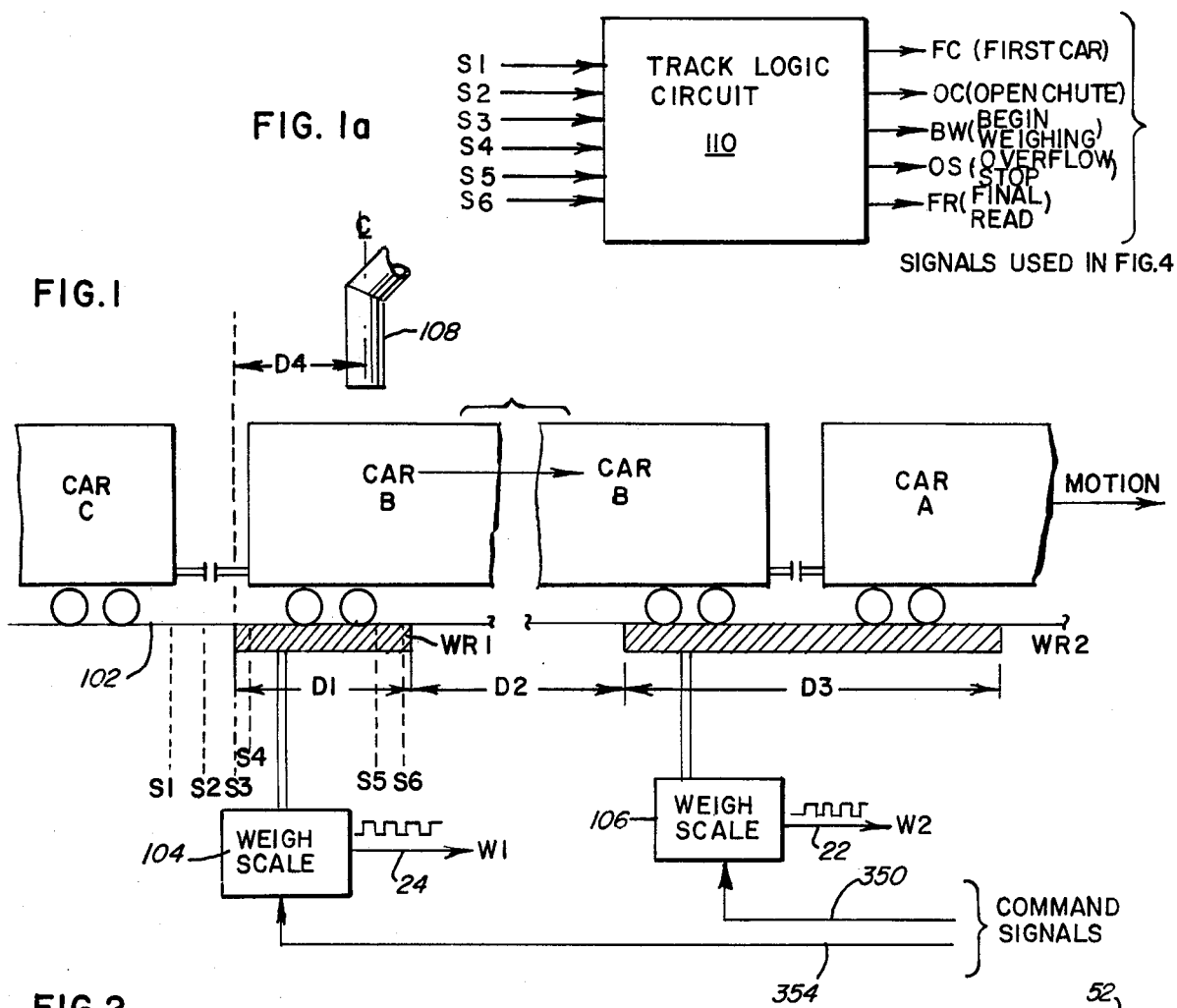
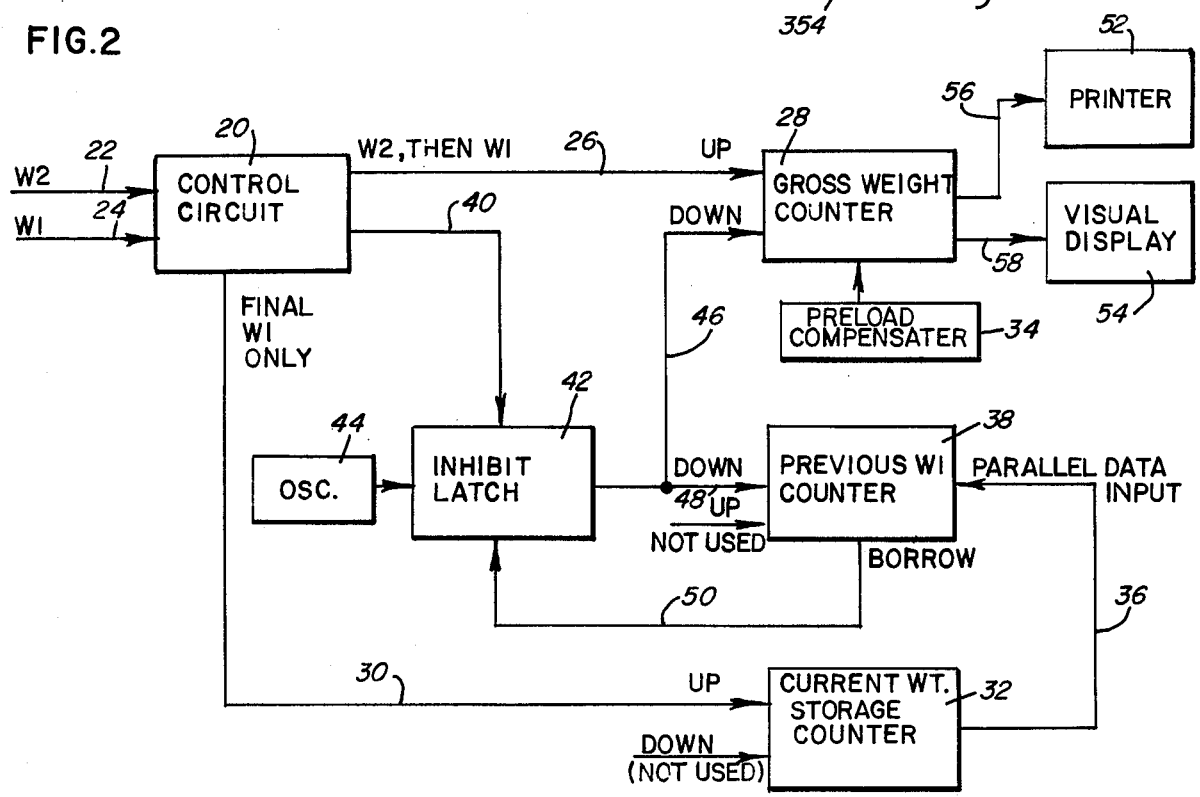

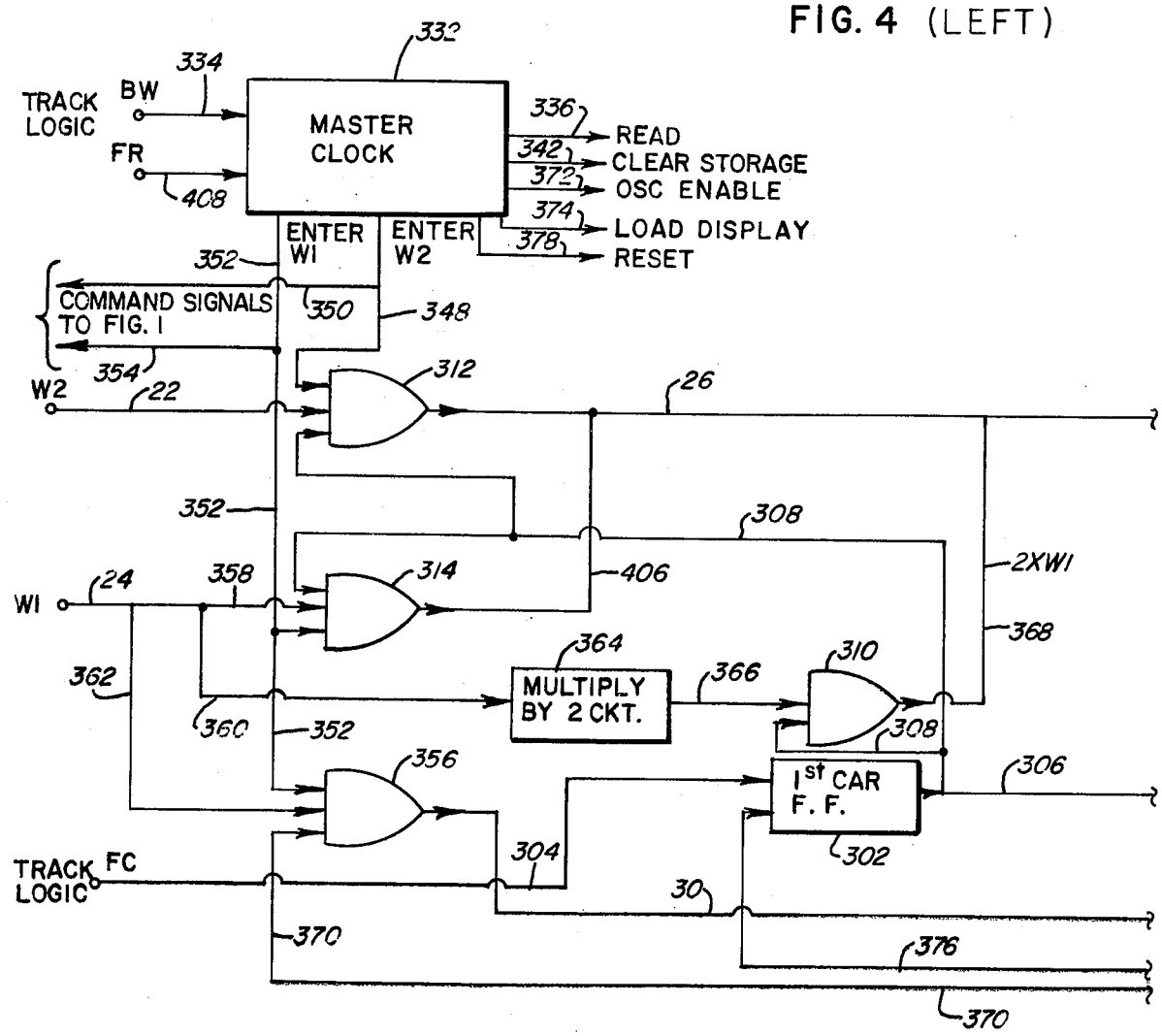
FIG. 4 (LEFT)
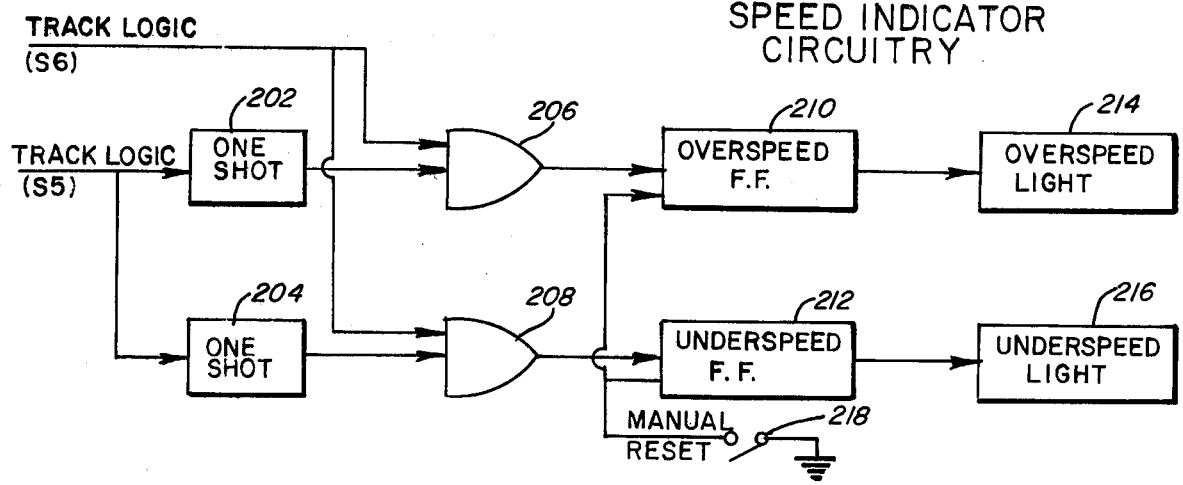
FIG. 3
SPEED INDICATOR CIRCUITRY

FIG. 4 (RIGHT)
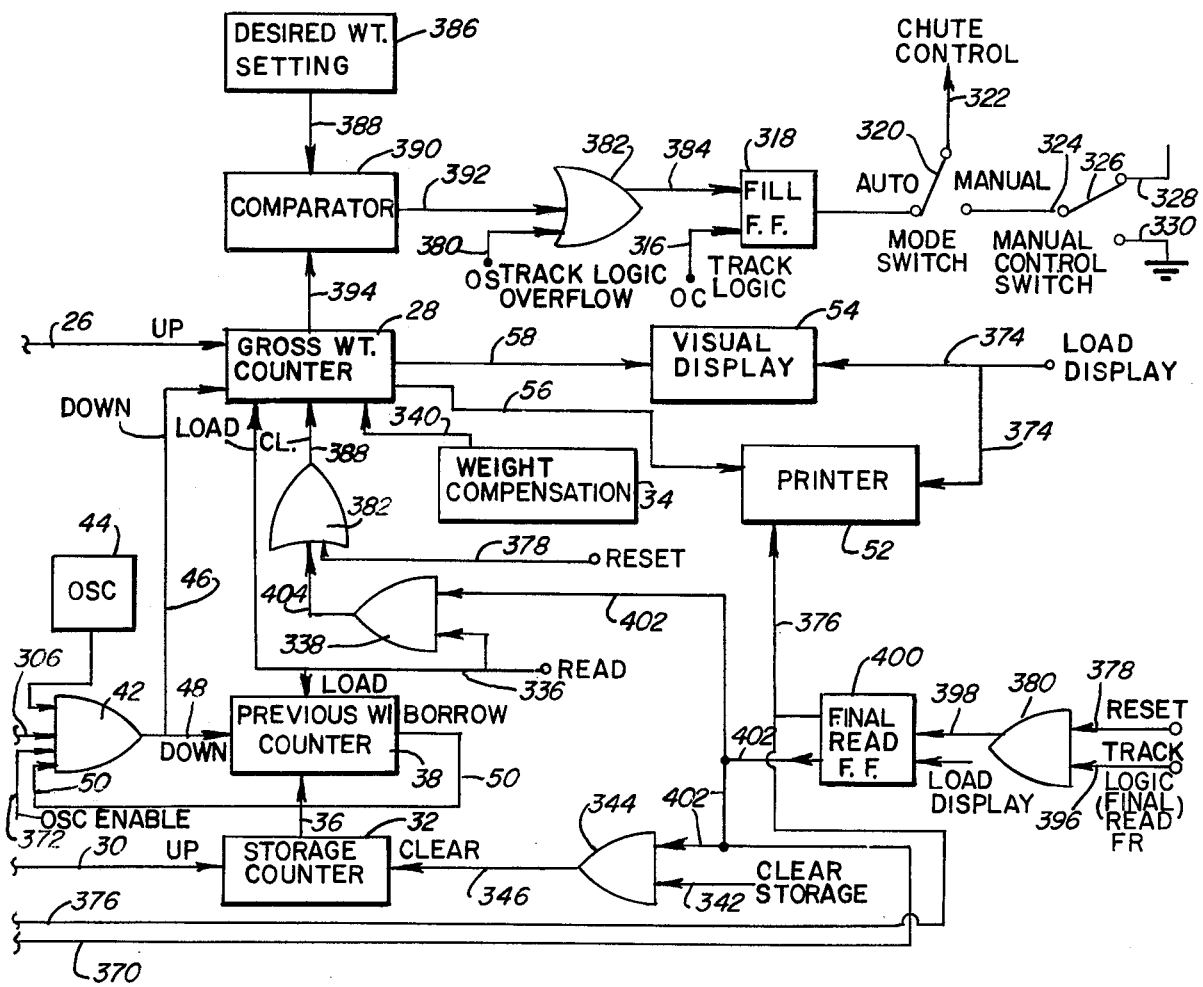
FIG. 5
CALCULATION TIMING DIAGRAM
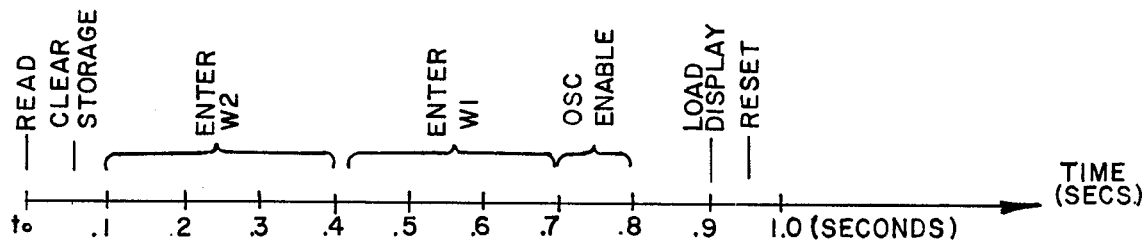

SYSTEM FOR SINGLE DRAFT WEIGHING OF CARS COUPLED IN MOTION

BACKGROUND OF THE INVENTION

The present invention relates to the weighing of railroad cars coupled in motion, and is particularly concerned with a system that is adaptable for coupled-in-motion weighing of railroad cars during loading thereof.

Many of the advantages of being able to weigh railroad cars while coupled and in motion are apparent. For maximum accuracy, full draft weighing of each railroad car is desirable, but has been found difficult to obtain with cars coupled in motion, because prior art full draft weighing has generally required a weigh platform that extends the entire length of the railroad car under consideration but does not extend far enough to include a portion of an adjacent railroad car. Such a full draft weighing system is not available with respect to the weighing of cars coupled in motion wherein the cars have slightly variable lengths.

It is also desirable to obtain an accurate weight reading during the loading of the railroad cars and while the railroad cars are coupled in motion. Maximum accuracy can be achieved by obtaining a full draft weight of the railroad car under consideration during loading thereof, with the loading being terminated automatically when the car has reached a predetermined weight.

One of the problems that has been found to exist when an attempt is made to accurately weigh the railroad car during loading thereof, is that once the railroad car reaches the predetermined weight and the loading chute is closed, additional material falls from the loading chute because there is a finite time delay in totally stopping the flow of material being loaded. It is desirable, therefore, that this overflow problem is alleviated.

An object of the present invention is, therefore, to provide an improved system for full draft weighing of railroad cars coupled in motion.

Another object of the present invention is to provide a system in which railroad cars coupled in motion are weighed as they are being loaded.

A further object of the present invention is to provide a coupled-in-motion weighing system that is relatively simple in operation and efficient to manufacture.

A still further object of the present invention is to provide a coupled-in-motion weighing system which is automatic in operation and utilizes logic circuitry to achieve its purpose.

Another object of the present invention is to provide a coupled-in-motion weighing system in which the loading of the car is accomplished during weighing, with the loading being initiated automatically and terminated automatically.

Another object of the present invention is to provide a coupled-in-motion weighing system in which a railroad car is loaded automatically with the loading being automatically discontinued if the railroad car is in position to pass from underneath the loading chute.

A further object of the present invention is to provide means for indicating if the speed of the railroad car being weighed is too slow or too fast for proper loading, to thereby indicate to the engineer that corrective action is appropriate so as to maintain the speed of the train within an acceptable range for weighing while the cars are coupled in motion.

Other objects and advantages of the present invention will become apparent as the description proceeds.

SUMMARY OF THE INVENTION

In accordance with the present invention, there is provided a system for weighing railroad cars coupled in motion, the railroad cars each having a front truck and a rear truck. The system comprises a first scale and a second scale located forward of the first scale. Means are provided for generating a signal corresponding to the weight on the first scale. Means are provided for generating a signal corresponding to the weight on the second scale. A previous weight counter is provided for storing the first scale weight corresponding to the weight of the rear truck of the just preceding railroad car. Means are provided for totaling (a) the present signals from the first scale, and (b) the present signals from the second scale corresponding to the total of the weights of the front truck of the railroad car under consideration and the rear truck of the just preceding railroad car. In addition, means are provided for subtracting from this total weight the stored rear truck weight of the just preceding railroad car to obtain the full draft weight of the railroad car under consideration.

In the illustrative embodiment, a chute is provided for loading the railroad car under consideration during weighing thereof. Means are provided for terminating the loading when the full draft weight reaches a predetermined amount or when the rear truck of the railroad car under consideration reaches a preselected location on the first scale.

In the illustrative embodiment, preload compensating means are provided for adding to the totaled weights on the first and second scales a preload compensating amount. This is accomplished to compensate for the weight material that will continue to be loaded into the railroad car under consideration after the signal to terminate the loading of the railroad car has been given.

In the illustrative embodiment, a plurality of discrete weighings are performed during loading of the railroad car under consideration. After the loading is terminated, a final weight reading is performed to obtain the full draft weight of the loaded car under consideration.

In the illustrative embodiment, the signal generating means comprises an analog to digital converter for providing pulses with the frequency of the pulses being proportional to the weight. The totaling means comprises a gross weight counter. The subtracting means comprises means for counting down the gross weight counter and the previous weight counter until the previous weight counter counts down to zero. In this manner, the gross weight counter will contain counts corresponding to the weights on the first scale and the second scale minus the weight of the rear truck of the just preceding railroad car.

A more detailed explanation of the invention is provided in the following description and claims, and is illustrated in the accompanying drawings.

BRIEF DESCRIPTION OF THE DRAWINGS

FIG. 1 is a diagrammatic representation of a weigh scale system for switching and providing weight pulses, constructed in accordance with the principles of the present invention;

FIG. 1a is a diagrammatic representation of the inputs and outputs to and from a track logic circuit;

FIG. 2 is a schematic block diagram of a gross weight computation circuit for coupled-in-motion weighing of railroad cars, constructed in accordance with the principles of the present invention;

FIG. 3 is a schematic block diagram of a speed indicator circuit for use in a coupled-in-motion weighing system in accordance with the principles of the present invention;

FIG. 4 (LEFT) and FIG. 4 (RIGHT), when connected together, form a block diagram of a control circuit for a coupled-in-motion weighing system constructed in accordance with the principles of the present invention; and FIG. 5 is a timing diagram showing an example of the timing which may be used in connection with the signals from the master clock of the FIG. 4 circuit.

DETAILED DESCRIPTION OF THE ILLUSTRATIVE EMBODIMENT

Referring to FIG. 1, railroad cars A, B and C are coupled together and are moving from left to right as indicated, on track 102.

Weighrails WR1 and WR2 are coupled to weigh scales 104 and 106, respectively. A command signal causes the weigh scales to generate W1 and W2, a series of digital pulses proportional to the weight sensed by weighrails WR1 and WR2. As an example, one pulse may represent one pound of weight.

The weighrails are of such length and are spaced apart so that when the rear truck of a car is resting upon WR1, that car's front truck will rest upon WR2 together with the rear truck of the just preceding car. As shown in FIG. 1, car B and car A have this relationship. The distances illustrated (with no limitations intended) are D1 = 12 feet 2 inches, D2 = 23 feet 9 inches, and D3 = 37 feet 9 inches. Thus, weight W1 is the rear truck weight of car B and W2 is the front truck weight of car B plus the rear truck weight of car A. The weight of car B is calculated using W1, W2, and a previously stored weight as is described below.

The cars are of the open-top type and are loaded from loading chute 108 as they pass underneath the chute. The chute is located as shown with D4 = 8 feet 4 inches. Loading chute 108 is controlled so that loading is started when the front of the car to be loaded is in a predetermined position and discontinued upon the car reaching the desired weight or the car about to pass from underneath the chute so as to prevent spilling the matter being loaded onto the track. The train's velocity is regulated so that the cars are substantially filled from front to back as they pass under stationary loading chute 108.

Track switches S1–S6 located adjacent track 102 are used in conjunction with logic circuitry to determine the position of the railroad cars as they move through the loading area. The switches are activated by the wheels of the cars. The position of a car can be determined by the sequence of operation of the switches based upon knowledge of: (1) the distance between two axle truck wheels; (2) distance between trucks on the same car; (3) distance between trucks of adjacent cars; and (4) distance from truck to the end of the car.

A suitable sequential switching system adaptable for use with the present invention is disclosed in Rogers' U.S. Pat. No. 3,374,844. In the illustrative embodiment, as one example, the track switches are located as follows (with respect to the left edge of weighrail WR1): S1 = 68; S2 = 31; S3 = 0; S4 = 6; S5 = 116; S6 = 140.

Each wheel of the train engine will generate the following track switch sequence: S1, S2, S3, S4, S5, S6.

Each truck of a 4 axle car is identified by the following track switch sequence: S4, S2, S3, S4. Detection of this sequence will indicate that the front truck of a car has entered weighrail WR1. After this condition is indicated, activation of S5 will start the flow of material from loading chute 108. At this time the car will be in the proper location for the loading to commence. Loading continues as the train moves from left to right as shown in FIG. 1. When the rear truck of the car being loaded again generates the same sequence (S4, S2, S3, S4) indicating its presence on weighrail WR1, the weight of car B is calculated. A new calculation of the car's weight is made approximately every second.

Loading terminates upon either the preselected weight being reached or activation of S5 by the front wheel of the rear truck. In case the preselected weight is not reached, S5 will stop the flow of material in time to prevent spillage by car B moving from underneath the loading chute.

Referring to FIG. 1a, track logic circuit 110 produces the output signals as shown. These output signals are utilized in the circuitry shown in FIG. 4. Track switches S1-S6 provide the needed sequence of operation information to track logic circuit 110. The track logic circuit includes standard commercially available gates and flip-flops normally used in the art.

The first car signal FC indicates that the first car to be loaded has entered into the loading area. This signal is produced only by the first S4, S2, S3, S4 track switch sequence of operation.

The open chute signal OC is used in conjunction with the circuitry in FIG. 4 to open the loading chute above the car once the car is in the proper position. This signal is produced upon the activation of track switch S5 when a prior switch sequence of S4, S2, S3, S4 has been sensed. Thus the front truck of each car will produce this sequence and upon the front wheel's activation of S5, the car will be in the proper position to be loaded by chute 108.

The "begin weighing" signal BW provides a signal to the weight calculation circuitry in FIG. 4 to being weight calculations. This signal is produced when the second truck of a car being loaded produces the track logic sequence S4, S2, S3, S4. This signal indicates that the rear truck is upon weigh rail WR1 and that the car's front truck is upon weigh rail WR2 together with the rear truck of the preceding car. Thus in this condition the weight of car B as shown in FIG. 1 may be calculated.

The overflow stop signal OS is produced when the front wheel of the rear truck of the car being loaded activates track switch S5. This signal is used to automatically stop the loading of material through chute 108 in case the desired weight has not been reached prior to the activation as aforementioned.

Final read signal FR is produced upon the activation of track switch S6 by the front wheel of the rear truck of the car being loaded. This indicates that loading is complete and that the final weight calculation is to be made.

FIG. 2 illustrates the method of computing the weight of individual railroad cars. As stated above, W1 and W2 represent digital signals corresponding to the weights as measured on weighrails WR1 and WR2, respectively.

Weight W2 is fed via line 22 and weight W1 via line 24 to control circuitry 20. Control circuitry 20 functions so as to allow either weight W2 or W1 to pass via line 26 to gross weight counter 28 or to allow weight W1 to pass or not to pass via line 30 to current weight storage counter 32.

For purposes of this explanation it is assumed that one or more cars have been previously weighed. The previous car's rear truck weight will have been stored in counter 32. The beginning weighing cycle of the current car begins with the preload compensator 34 entering into counter 28 a digital signal which represents the weight of material that will continue to be loaded into the current car after the signal to close the chute has been given. This material overshoot occurs because there is a finite time required before the entire amount of material flow can be entirely stopped. Preload compensation 34 is adjustable so that various amounts of weight overshoot may be provided to compensate for different materials which may be loaded and for different time delays before all material flow is stopped.

Thereafter weight W2 is loaded into counter 28 via line 26. Thus counter 28 contains the sum of W2 plus the value previously entered from the preload compensator. Next, weight W1 is loaded into counter 28 via line 26. W1 is prevented from being simultaneously loaded into current weight storage counter 32 by control circuitry 20 because W1 does not represent the final weight of weighrail WR1 but only an intermediate weight. Thus, gross weight counter 28 now contains W2 + W1 + a preload compensator value. The weight of W2 that was entered, i.e. the weight resting upon weighrail WR2, comprises the weight of the front truck of the current car being loaded (Car B) plus the rear truck weight of the just preceding car (Car A). Therefore, the value contained in the gross weight counter equals the current weight of the car being loaded plus the rear truck weight of the preceding car plus the overshoot weight allowed for by the preload compensator.

To obtain the current weight of the car being loaded (plus overshoot) the rear truck weight of the previous car is subtracted. This is accomplished as follows. The weight of the rear truck of the preceding car is stored in storage counter 32. This value is loaded into previous W1 counter 38 via line 36. Control circuitry 20 via line 40 causes the inhibit latch 42 to permit digital pulses from the free running oscillator 44 to pass to gross weight counter 28 and previous W1 weight counter 38 via lines 46 and 48 respectively. Each pulse of the oscillator causes the values contained in counters 28 and 38 to be decremented by one count. The oscillator continues to decrement both counters until the value in the previous W1 counter 38 reaches zero. Upon reaching zero, a borrow signal on line 50 causes inhibit latch 42 to inhibit the pulses of oscillator 44 from passing to the two counters. Thus the value stored in the previous W1 counter 38 (which was the rear truck weight of the preceding car) has effectively been subtracted from the gross weight counter 28.

The gross weight counter 28 now contains the weight of the current car being loaded plus the value allowed for overshoot. The value then contained in gross weight counter 28 is entered into the visual display 54 via line 58 to visually display the current weight of the car being loaded (plus overshoot).

When the car loading is complete, a final read sequence will be initiated. The final read sequence proceeds the same as the above-described operation except as to the following. Since the loading is actually completed, no overshoot value need be used. In this final cycle, no overshoot value from the preload compensator 34 is loaded into gross weight counter 28. Therefore, after the subtraction of previous W1 counter's value, the value contained in gross weight counter 28 is the true gross weight of the current loaded car. In addition to being visually displayed, the value contained in gross weight counter 28 is also loaded via line 56 into printer 52 which then prints the gross weight of the car loaded. Since the rear truck weight of the currently loaded car will be needed for computation during the loading of the next car, control circuitry 20 now allows the final weight value of W1 to be stored in storage counter 32 via line 30, simultaneously as W1 is loaded into gross weight counter 28.

Referring now to FIG. 3, speed indicator circuitry is used to provide a visual indication if the train is moving either too slow or too fast to ensure proper loading of the cars. If the train's speed is greater than a selected minimum speed and less than a selected maximum speed, no indication is given. If the train's speed exceeds the maximum, an overspeed indication is given and if the speed is below the minimum, an underspeed indication is given.

Each wheel of the cars to be loaded activates the track switch S5 and S6 in the squence S5, S6. Activation of track switch S5 triggers one-shot multivibrators 202 and 204. The time period of the output pulse of one-shot 202 is adjusted to correspond with the maximum allowable rate of speed. The time period of the output pulse of one-shot 204 is adjusted to correspond with the minimum allowable rate of speed.

A train moving at an acceptable rate of speed will produce the following sequence of operation. Activation of track switch S5 triggers one-shots 202 and 204. If the train is moving less than the maximum allowable speed, one-shot 202 will time out before the activation of track switch S6. Unless the signal representing the activation of track switch S6 passes through gate 206 and to overspeed flip-flop 210, the flip-flop will remain in its original state and overspeed light 214 will not be energized. Gate 206 is inhibited by the output from one-shot 202 only when one-shot 202 has timed out. If activation of track switch S6 occurs prior to the timing out of one-shot 202, the signal from track switch S6 will pass through gate 206 and will trigger overspeed flip-flop 210, resulting in energization of overspeed light 214.

A train moving at an acceptable speed will cause the activation of switch S6 prior to the timing out of one-shot 204. If one-shot 204 times out prior to the activation of switch S6, the one-shot's output signal will be permitted to pass through gate 208 and to underspeed flip-flop 212 allowing it to change state and activate underspeed light 216. The activation of switch S6 prior to the timing out of one-shot 204 will inhibit gate 208 thereby preventing the signal from one-shot 204 from passing to the underspeed flip-flop.

An underspeed or overspeed indication will be communicated to the train's engineer, thereby permitting an appropriate correction to the train's speed. After communication of this information, manual reset switch 218 can be activated thereby causing the overspeed or underspeed flip-flop to be reset.

FIG. 4 shows by block diagram the computation circuitry used to calculate the weight of individual loaded railroad cars and the circuitry used to control the automatic start and stop of loading chute 108. Gross weight counter 28, previous W1 counter 38, and storage counter 32 each comprise commercially available up-/down counters connected in series so as to allow the counting of six-digit numbers. The master clock comprises an oscillator running at a frequency of 10 Hertz, hertz, counter capable of counting up to 10, and gating so as to provide the outputs shown in the calculation timing diagram in FIG. 5. This is merely an illustrative example, and no limitation should be implied.

Because the weight calculation circuitry shown in FIG. 4 calculates the weight of the first car differently from the weights of successive cars, the operation of the circuitry for weighing the first car will be described first. A first car flip-flop 302 is triggered by track logic signal FC from line 304. The output of the first car flip-flop, coupled by line 306 to AND gate 42, serves to inhibit gate 42 and thereby prevent the signal from passing from oscillator 44 through gate 42. Thus gate 42 is inhibited during the time in which the first car flip-flop is activated.

The output of first car flip-flop 302 is also connected by line 308 to AND gate 310, AND gate 312, and to AND gate 314. This output serves to inhibit gates 312 and 314 during the time in which the first car flip-flop has been activated by signal FC. The output from first car flip-flop 302 serves normally to inhibit gate 310, but after activation of the first car flip-flop by signal FC the output releases its inhibiting effect upon gate 310. Track logic signal OC is connected to fill flip-flop 318 by line 316. The generation of signal OC is sensed by flip-flop 318 and its output changes state. Its output is connected through switch 320 and by line 322 to the chute control circuitry. The chute control circuitry may include either a relay or solid state voltage sensing circuitry. The voltage change of state by fill flip-flop 318 is sensed and causes the chute control circuitry to permit the flow of material through loading chute 108. This sequence of events occurs if the load switch 320 is in the automatic position, as shown in FIG. 4. However, if manual control of the loading chute is desired, switch 320 may be thrown to the manual position which is connected by line 324 to manual control switch 326. The change of voltage state needed to control the loading chute circuitry is provided by manual control switch 326 since the switch may be connected either to a supply voltage by line 328 or to ground by line 330.

Track logic signal BW is connected to master clock 332 by line 334. Upon receipt of signal BW, master clock 332 will begin to cycle according to the timing diagram shown in FIG. 5. Thus master clock 332 generates a "read" pulse, as indicated in FIG. 5, and is connected via line 336 to previous W1 counter 38, gross weight counter 28, and to AND gate 338. This causes gross weight counter 28 to load the weight held by weight compensation element 34 via line 340. Weight compensation element 34 includes a bank of switches connected to the parallel loading input 340 of gross weight counter 28. The count which is loaded into the gross weight counter serves to compensate for the amount of material which will be loaded after the command signal is given to close the chute.

The read signal is also connected to previous W1 counter 38 and serves to load counter 38 from storage couner 32 by parallel input lines represented by line 36. Storage counter 32 serves to store weight W1 which represents the preceding car's rear truck weight as sensed by weigh rail WR1. However, since the first car is being weighed, storage counter 32 will contain "zero" weight. AND gate 338 also receives the read signal via line 336. Explanation of the operation of AND gate 338 will be discussed later in the discussion of the final weight sequence.

A "clear storage" signal is generated by master clock 332 and is connected by line 342 to AND gate 344. The output of AND gate 344 is connected to storage counter 32 by line 346. The operation of AND gate 344 will be discussed later in the discussion relative to the final read sequence.

The master clock then generates an "enter W2" signal lasting from 0.1 seconds to 0.4 seconds, as shown in FIG. 5. This output of the master clock is connected by line 348 to gate 312 and releases its inhibiting function over gate 312. The master clock's output is also connected by line 350 to weigh scale 106 (FIG. 1). This signal causes weigh scale 106 to generate a series of pulses representative of weight W2. Since this is the first car, the front truck of the first car will be upon weigh rail WR2 and will be connected to the engine which will also be upon weight rail WR2. In this condition, the weight represented by W2 would not correspond to the preceding car's rear truck weight plus the front truck weight of the car being loaded. Weight W2 is transmitted by line 22 to gate 312. During the weighing of the first car, gate 312 is inhibited by the first car flip-flop 302 via line 308. Therefore, the W2 pulses are inhibited from being transmitted through gate 312 and line 26 to gross weight counter 28.

Master clock 332 next generates an "enter W1" signal, as indicated in FIG. 5. This output is connected by line 352 to gate 314 and gate 356. During the generation of the "enter W1" signal, the normal inhibiting function of line 352 is removed from gates 314 and 356. Therefore, unless these gates are inhibited from other lines, they will be free to pass weight W1.

The "enter W1" signal is also fed by line 354 to weigh scale 104 (FIG. 1). This signal causes weigh scale 104 to generate a series of pulses representing weight W1 (which is the weight sensed by weigh rail WR1). In this case, W1 represents the weight sensed from the rear truck of the first car. Thus during the "enter W1" command signal, W1 is transmitted via line 24 to circuitry shown in FIG. 4. This signal is connected from line 24 via line 358 to gate 314, by line 360 to the multiply-by-two circuitry 364, and by line 362 to gate 356. Gate 314 is inhibited by line 308 from the first car flip-flop. Thus weight W1 is not allowed to pass through gate 314. The multiply-by-two circuit 364 multiplies weight as represented by pulses W1 times two. Thus two times weight W1 is transmitted by line 366 to gate 310. Gate 310 is released during the weighing of the first car by line 308 from first car flip-flop 302. Thus two times W1 passes through gate 310, line 368, line 26 and then to the upcount input of gross weight counter 28. This causes gross weight counter 28 to count two times W1. Thus gross weight counter now contains twice the representative weight indicated by W1 plus the weight compensation previously entered. W1 is also connected from line 24 through line 362 to gate 356. Although gate 356 is not inhibited by line 352 during the enter W1 period, it is inhibited by line 370, which is the output of final read flip-flop 400. Gate 356 will remain inhibited by line 370 until the final read flip-flop 400 (described below) changes state.

Master clock 332 next generates an "oscillator enable" signal during the time period as shown in FIG. 5. This output is connected by line 372 to AND gate 42. Gate 42 is normally inhibited by line 372 except during the oscillator enable time period. However, since this is the first car, the first car flip-flop 302 by line 306 will inhibit gate 42, thereby preventing the output of oscillator 44 from passing.

Master clock 332 then generates a load display signal which is connected by line 374 to visual display 54 and printer 52. This will cause the weight contained in gross weight counter 28 to be loaded into visual display 54 and printer 52. Visual display 54 will visually show the current weight stored in the gross weight counter. However, printer 52 will not print out this intermediate weight because it is inhibited by line 376 and will be inhibited by this line until the final read sequence is initiated.

Master clock 332 next generates a "reset" pulse signal which is connected by line 378 to AND gate 380 and to OR gate 382. The output of AND gate 380 will not change state since the other required input will not have occurred. However, the output of OR gate 382 connected by line 388 to the clear input of gross weight counter 28 will change state. This will reset the gross weight counter to zero or no weight.

When the master clock 332 reaches the tenth count representing one second of elapsed time, the sequence as just described will be repeated. This sequence will continue to be repeated until a track logic signal FR (final read) signal is generated.

However, prior to the generation of the FR signal, a command to close the loading chute will have been initiated. This may occur by one of two ways. First, it may occur because of the generation of track logic signal OS. Signal OS is connected by line 381 to OR gate 383. The OR gate's output 384 is connected to fill flip-flop 318. The generation of signal OS will be transmitted through the OR gate by line 384 to the fill flip-flop causing it to change state. Thus the flip-flop's output will be at the normal or passive condition and the loading chute will then close.

The other means by which the loading chute control will close is if the weight contained in the gross weight counter 28 exceeds a predetermined weight. This predetermined weight is contained in desired weight setting counter 386 by means of a series of control switches. This desired weight is parallel coupled through lines as represented by line 388 to comparator 390. The weight contained in gross weight counter 28 is also parallel coupled by lines as represented by line 394 to the comparator 390. When the weight contained by gross weight counter 28 exceeds the desired weight setting of counter 386, the output of comparator 390 will change. Comparator 390's output is coupled by line 392 to OR gate 383 which in turn is connected to fill flip-flop 318. Thus, upon the weight of the gross weight counter exceeding the preset weight, the fill flip-flop 318 will be reset to its original state causing the loading chute control to close the chute.

The generation of signal FR by the track logic circuitry is coupled by line 396 to AND gate 380 (FIG. 4-right). The next generation of the reset pulse signal by master clock 332, as coupled to AND gate 380 by line 378, will cause the AND gate's output (connected by line 398 to final read flip-flop 400) to change state. This in turn will cause the final read flip-flop's output to also change state. One output of final read flip-flop 400 is connected by line 402 to AND gate 344 and AND gate 338. During the generation of the read signal by master clock 332, both inputs to AND gate 338 will be as required to produce a change in its output state. Its output is connected by line 404 to OR gate 382 which in turn is connected by line 388 to the clear input of gross weight counter 28. Thus, during the final read condition the read signal will cause the gross weight counter to be cleared such that the weight compensation normally entered via line 340 will be negated. Therefore, the gross weight counter 28 will begin with zero weight.

A similar result is achieved with storage counter 32. During the master clock's generation of the clear storage signal as connected by line 342 to AND gate 344 (FIG. 4-right), the AND gate's output as connected by 346 to storage counter 32 will change state. The storage counter originally contained zero or no weight because this was the first car. However, in succeeding cars the storage counter would have contained the previous car's W1 weight. This weight would have been reset or cleared, making the storage counter 32 contain zero or no weight.

The output of final read flip-flop 400 is connected by line 402 also to line 370 which in turn is connected to AND gate 356. Line 370 normally serves to inhibit gate 356 until final read flip-flop has been activated. Thus, during the time when the master clock generates an enter W1 command, gate 356 will be free to pass W1 via lines 24, 362, gate 356 and line 30 to storage counter 32. This will cause storage counter 32 to count the pulses representing weight W1. The first car's rear truck weight represented by W1 will thereby be stored in storage counter 32 for use in calculating the succeeding car's weight.

The operation of the weight calculation circuitry actually functions in a similar manner to that previously described above except as indicated that the weight compensation 34 will not have been previously entered into gross weight counter 28. Thus the gross weight counter will contain two times weight W1. Upon the master clock's generation of the load display signal, the weight contained in gross weight counter 28 will be transferred to visual display 54 and printer 52. However, this time printer 52 will print the weight as loaded from gross weight counter 28 because line 376 from final read flip-flop 400 has since changed state and is no longer prohibiting the printer from printing out. Upon the trailing edge of the load display signal, final read flip-flop 400 is reset to its normal state. The change of its output transmitted via line 376 to the first car flip-flop 302 causes first car flip-flop 302 to change state. Thus first car flip-flop 302 no longer is indicating that the car to be weighed is the first car.

From the above description it will be noted that during the weighing of the first car the car's total weight is assumed to be twice the weight sensed upon the rear truck of the car. This method of calculation is necessitated because of the presence of weigh rail WR2 as a part of the engine pulling the first car. Subsequent cars' weights are calculated in a different manner, as described below.

The weight calculation of the second car and the control of loading chute 108 is similar to that previously described above relating to the weighing of the first car. Master clock 332 functions in exactly the same manner as previously described above and in the time sequence as indicated by calculation timing diagram as shown in FIG. 5.

The circuitry as shown in FIG. 4 is in the same initial state as for the weighing of the first car with the exception that the storage counter 32 now contains the weight (W1) of the rear truck of the first car. The track logic does not generate a first car FC signal and therefore first car flip-flop 302 is never activated. As a result, AND gate 310 is at all times inhibited because of the output of first car flip-flop 302 as connected by line 308. Gates 312 and 314 are not inhibited, as the first car flip-flop 302 is not activated. Thus, the control of gate 312 and 314 is controlled solely by other lines which may inhibit these gates.

The "read" and "clear storage" signals generated by master clock 332 operate in the same manner as for the first car. Thus at the end of the "clear storage" pulse, gross weight counter 28 will be loaded from weight compensator 34 by line 340 to a preset weight so as to allow for material which will continue to be loaded into the car after the signal to close the loading chute has been initiated.

The "enter W2" command signal via line 350 from master clock 332 causes the weigh scale 106, as shown in FIG. 1, to generate pulses representing weight W2. This weight W2 is coupled to gate 312 by line 22 and since the gate is not inhibited the pulses pass through the gate via line 26 to gross weight counter 28's up-count input. Thus gross weight counter 28 now contains weight W2 plus the weight compensation previously entered. The generation of "enter W1" signal via line 354 by master clock 332 causes the weigh scale, as shown in FIG. 1, to outpulse weight W1 which is coupled via line 24 and 358 to AND gate 314. Gate 314 is not inhibited either by line 308 or 352 and thereby allows weight W1 to pass by lines 406 and 26 to the up-count input of gross weight counter 28. Thus the gross weight counter now contains the weight of W1 plus W2 plus the compensation weight previously entered.

W1 is also coupled by line 24 and 360 to the multiply-by-two circuit 364 and is multiplied by two. The multiply-by-two circuit output coupled by line 366 to gate 310 stops at this point, however, since gate 310 is inhibited by line 308.

Weight W1 is also coupled by line 24 and 362 to gate 356. Although this gate is not inhibited by line 352, it is inhibited by line 370 from the final read flip-flop 400. This gate remains inhibited by line 370 at all times except during the final read sequence. During the final read sequence, storage counter 32 will have been previously cleared and the final W1 weight which will be needed for the calculation of the next car's weight will be entered into storage counter 32 through line 30 and thus stored.

Prior to the master clock 332 generating the "oscillator enable" output, the condition of the circuitry is as follows: Gross weight counter 28 contains weight W1 plus W2 plus weight compensation; previous W1 counter 38 contains the previous car's W1 weight since this weight was transferred from storage counter 32 during the master clock's read signal generation; and storage counter 32 still contains the previous car's W1 weight. The "oscillator enable" signal coupled from master clock 332 by line 372 to AND gate 42 normally inhibits oscillator 44's output from passing. However, during the activation of the "oscillator enable" signal, this inhibit state is removed and oscillator 44's output passes through lines 46 and 48 to gross weight counter 28 and previous W1 weight counter 38, respectively. The pulses generated by the oscillator are applied to the countdown input of each of these counters. This causes the counters to subtract or count down from their previously stored weight count. When previous W1 counter 38 reaches zero, the borrow output is coupled by line 50 to gate 42. This inhibits gate 42, thereby stopping the passage of oscillator pulses from oscillator 44. What has been effectively accomplished is that the weight as stored in previous W1 counter 38 has been subtracted from the total prior weight stored in gross weight counter 28. Thus, gross weight counter 28 now contains a count representing the weight of the car being loaded plus weight compensation. By referring to FIG. 1, it may be seen that in this condition the count represented in gross weight counter 28 represents only the weight of the current car being loaded.

The calculation circuit's response to master clock generation of load display and reset signals are the same as previously described for the first car being weighed.

The closing of loading chute 108 is accomplished similarly to that described previously for the first car, that is, either (a) the comparator 390's recognition that the gross weight counter contains a weight larger than that desired weight setting 386 weight will cause the chute to close, or (b) a track logic signal OS will also cause closing of the chute.

After the chute has been closed, a final read FR signal will be generated by the track logic. During the next cycle preceding the receipt of the FR signal, the gross weight counter 28 will not be preloaded by a weight compensation from weight compensator 34. Since all the material that is going to be loaded into the car has been loaded, there is no need for this compensation to occur. During the "read" command, previous W1 counter 38 will be loaded with the previous W1 weight as stored by storage counter 32. During the "clear storage" signal, storage counter 32 will be cleared and reset to zero weight. Weight W2 will then be entered into gross weight counter 28.

While weight W1 is being entered into gross weight counter 28, it will also be simultaneously entered into storage counter 32 via line 24, line 362, gate 356, line 30, to the up-count input of storage counter 32. Thus, storage counter 32 will contain the final W1 weight of the current car that has been loaded (i.e, the rear truck weight of this car). This will be stored for computation of the weight of the next car to be loaded. Thus gross weight counter 28 contains the current W2 weight plus the current W1 weight. The "oscillator enable" signal will allow previous W1 counter 38 to subtract the previous car's W1 weight that it contained from gross weight counter 28. Therefore, gross weight counter 28 will contain the second car's true loaded weight. This weight will then be fed to visual display 54 and printer 52 which will thereby be released and print out the true weight of the second car. At the end of the "load display" pulse as generated by master clock 332, the final read flip-flop will be reset and the circuitry is returned to its initial state as previously described. Storage counter 32 will therefore contain the last W1 weight of the loaded car for use in computing the weight of the next car to be loaded. Weight calculations for the third and all subsequent cars proceed in the same manner as that which has been previously described for the calculation and chute control's operation during the loading of the second car.

Referring now to FIG. 5, the time relationship of the output signals created by master clock 332 can be more clearly understood. Upon the master clock's counter reaching the tenth count representing one second, the counter is reset and the process is repeated. This process will continue to be repeated until the track logic circuitry generates an FR signal. The master clock will continue one more cycle after the receipt of signal FR so that the final weight calculation is made. After completing the final weight calculation cycle, the master clock's oscillator will be disabled until reenabled by track logic signal BW.

Although an illustrative embodiment of the invention has been shown and described, it is to be understood that various modifications and substitutions may be made by those skilled in the art without departing from the novel spirit and scope of the present invention.

What is claimed is:

1. A method for weighing railroad cars coupled in motion, each of which railroad cars has a front truck and a rear truck, comprising the steps of:
    (a) providing a first scale and a second scale located forward of said first scale;
    (b) moving said railroad cars over said first and second scales;
    (c) weighing the rear trucks on said first scale and storing said weight;
    (d) while the rear truck of a railroad car under consideration is on said first scale, weighing on said second scale the front truck of the railroad car under consideration and the rear truck of the just preceding railroad car;
    (e) totaling the weights on the first and second scales; and
    (f) subtracting the stored weight of the rear truck of the just preceding railroad car to obtain the full draft weight of the railroad car under consideration.

2. A method for weighing railroad cars as described in claim 1, including the steps of loading the railroad car under consideration during the weighing thereof; and terminating said loading when the weight reaches a predetermined amount.

3. A method as described in claim 2, and further including the step of terminating the loading of the railroad car under consideration when the rear truck of said railroad car reaches a preselected location on said first scale.

4. A method for weighing railroad cars as described in claim 2, including the step of adding to the totaled weights on the first and second scales a preload compensating amount to compensate for the weight of material that will continue to be loaded into the railroad car under consideration after the signal to terminate the loading has been given.

5. A method for weighing railroad cars as described in claim 2, including the step of performing a plurality of discrete weighings during loading of the railroad car under consideration; and, after the loading is terminated, performing a final weight reading to obtain the full draft weight of the loaded car under consideration.

6. A method for weighing railroad cars as described in claim 5, wherein during the plurality of discrete weighings except for the final weight reading, there is included the step of adding to the totaled weights on the first and second scales a preload compensating amount to compensate for the weight of material that will continue to be loaded into the railroad car under consideration after the signal to terminate the loading has been given.

7. A method for weighing railroad cars coupled in motion during loading of the railroad cars, wherein each of the railroad cars has a front truck and a rear truck, comprising the steps of:
    (a) providing a first scale and a second scale located forward of said first scale;
    (b) moving said railroad cars over said first and second scales;
    (c) performing a plurality of discrete weighings during loading of a railroad car under consideration, each of said discrete weighings including the step of totaling the weights on said first and second scales and adding to the totaled weights on the first and second scales a preload compensating amount to compensate for the weight of material that will continue to be loaded into the railroad car under consideration after a signal to terminate the loading has been given;
    (d) while the rear truck of the railroad car under consideration is on said first scale, weighing on said second scale the front truck of the railroad car under consideration and the rear truck of the just preceding railroad car;
    (e) totaling the weights on the first and second scales; and
    (f) subtracting the stored weight of the rear truck of the just preceding railroad car to obtain the full draft weight of the railroad car under consideration.

8. A method as described in claim 7, including the step of providing a signal for terminating said loading when one of the following occurs: (a) the weight reaches a predetermined amount, (b) the rear truck of the railroad car under consideration reaches a preselected location on said first scale.

9. A method as described in claim 7, including the step of performing a final weight reading after the loading is terminated to obtain the full draft weight of the loaded car under consideration, with the final weight reading not including any preload compensating amount.

10. A system for weighing railroad cars coupled in motion, which railroad cars each have a front truck and a rear truck, which comprises: a first scale and a second scale located forward of said first scale; means for providing a signal corresponding to the weight on said first scale; means for providing a signal corresponding to the weight on said second scale; means for storing said rear truck weight signals; means for totaling (a) the signal from said first scale and (b) the signal from said second scale corresponding to the total of the weights of the front truck of the railroad car under consideration and the rear truck of the just preceding railroad car; and means for subtracting from said total weight the stored rear truck weight of the just preceding railroad car to obtain the full draft weight of the railroad car under consideration.

11. A system as described in claim 10, said signal providing means comprising an analog to digital converter for providing pulses with the frequency of the pulses being proportional to the weight.

12. A system as described in claim 10, said storing means comprising a previous weight counter and said totaling means comprising a gross weight counter.

13. A system as described in claim 12, said subtracting means comprising means for counting down said gross weight counter and said previous weight counter until said previous weight counter counts down to zero, whereby the gross weight counter will contain counts corresponding to the weights on said first scale and said second scale minus the weight of the just preceding railroad car.

14. A system as described in claim 13, including a storage counter; and means for shifting the counts from said storage counter to said previous weight counter.

15. A system as described in claim 13, including feedback means from said previous weight counter to inhibit further countdown in response to a borrow signal from said previous weight counter.

16. A system as described in claim 15, said counters comprising binary up/down counters having BCD outputs, and digital display means coupled to said gross weight counter output.

17. A system for weighing railroad cars coupled in motion, which railroad cars each have a front truck and a rear truck, which comprises: a first scale; a second scale located forward of said first scale; means for providing first scale weight signals; means for providing second scale weight signals; a gross weight counter for counting both said first scale weight signals and said second scale weight signals; a current weight storage counter for counting and storing said first scale weight signals; a previous weight counter for storing previous first scale weight signals from said current weight storage counter; means for feeding to said gross weight counter, while a railroad car under consideration is on said first and second scales and the rear truck of a just-preceding railroad car is also on the second scale, first scale weight signals and second scale weight signals; means for feeding to said current weight storage counter first scale weight signals; means for simultaneously decrementing the counts from said gross weight counter and said previous weight counter; means for inhibiting said decrementing means in response to a borrow signal from said previous weight counter; means for displaying the counts remaining in said gross weight counter; and means for shifting the counts from the current weight storage counter to the previous weight counter subsequent to receipt of said borrow signal.

18. A system for weighing railroad cars coupled in motion and during loading thereof, which railroad cars each have a front truck and a rear truck, which comprises: a first scale and a second scale located forward of said first scale; a loading chute; means for controlling the output of said loading chute; means for providing a signal corresponding to the weight on said first scale; means for providing a signal corresponding to the weight on said second scale; means for storing said first scale weight signal corresponding to the rear truck weight of the just preceding railroad car; means for totaling (a) the present signal from said first scale, and (b) the present signal from said second scale corresponding to the total of the weights of the front truck of the railroad car under consideration and the rear truck of the just preceding railroad car; means for subtracting from said total weight the stored first scale weight corresponding to the rear truck weight of the just preceding railroad car to obtain the full draft weight of the railroad car under consideration; and means for signaling said chute control means for terminating the loading when the weight reaches a predetermined amount.

19. A system as described in claim 18, including means for terminating the loading when the rear truck of the railroad car under consideration reaches a preselected location on said first scale.

20. A system as described in claim 18, including preload compensator means for adding a preload compensating amount to said totaling means to compensate for the weight of material that will continue to fall through the chute into the railroad car under consideration after the signal to said chute control means has been provided.

21. A system as described in claim 18, including means for taking a plurality of discrete weight readings during loading of the railroad car under consideration.

22. A system as described in claim 18, in which said signal providing means comprises an analog to digital converter for providing pulses with the frequency of the pulses being proportional to the weight.

23. A system as described in claim 18, in which said storing means comprises a previous weight counter and said totaling means comprises a gross weight counter.

24. A system as described in claim 23, said subtracting means comprising means for counting down said gross weight counter and said previous weight counter until said previous weight counter counts down to zero, whereby the gross weight counter wll contain counts corresponding to the weights on said first scale and said second scale minus the weight of the rear truck of the just preceding railroad car.

25. A system as described in claim 24, including a current first scale weight storage counter; and means for shifting the counts from said current first scale weight storage counter to said prevous weight counter.

26. A system as described in claim 24, including feedback means from said previous weight counter to inhibit further countdown in response to a borrow signal from said previous weight counter.

27. A system as described in claim 26, said counters comprising binary up/down counters having BCD outputs, and digital display means coupled to said gross weight counter output.

* * * * *